United States Patent
Buchanan et al.

[11] Patent Number: 5,993,012
[45] Date of Patent: Nov. 30, 1999

[54] OPTICAL DOCKING STATION

[75] Inventors: David R. Buchanan, Scottsdale; Dan J. Schott, Phoenix; Bart D. Millikan, Gilbert, all of Ariz.

[73] Assignee: Three-Five Systems, Inc., Tempe, Ariz.

[21] Appl. No.: 09/162,700

[22] Filed: Sep. 29, 1998

[51] Int. Cl.[6] .................................................... G03B 21/14
[52] U.S. Cl. ............................................. 353/119; 353/71
[58] Field of Search .................................. 353/20, 30, 34, 353/37, 8; 349/8, 9; 348/744; 353/31, 29, 21, 88, 89, 119, 71; 359/630

[56] References Cited

U.S. PATENT DOCUMENTS

| | | | |
|---|---|---|---|
| 4,650,286 | 3/1987 | Koda et al. | 350/331 |
| 4,973,884 | 11/1990 | Schwartz et al. | 315/306 |
| 5,214,457 | 5/1993 | Takanashi et al. | 353/31 |
| 5,355,188 | 10/1994 | Biles et al. | 353/69 |
| 5,543,958 | 8/1996 | Lebby et al. | 359/254 |
| 5,829,858 | 11/1998 | Levis et al. | 353/38 |
| 5,836,664 | 11/1998 | Conner et al. | 353/70 |
| 5,853,240 | 12/1998 | Kanaka et al. | 353/20 |

FOREIGN PATENT DOCUMENTS 6-153121   5/1994   Japan .

*Primary Examiner*—William C. Dowling
*Attorney, Agent, or Firm*—John D. Titus

[57] ABSTRACT

An optical docking station comprises an optical frame and a detachable virtual image display module. The display module comprises a low power light source such as a light emitting diode, one or more beam splitters, polarizers, a liquid crystal display panel and an imaging lens. When the display module is detached from the optical frame, the light emitting diode provides the primary illumination for the image formed by the liquid crystal display panel. The image thus formed is a magnified virtual image of the liquid crystal display panel. When the display module is attached to the projector frame, however, a more powerful light source mounted to the optical frame provides the primary illumination. The more powerful light source forms a real image of the liquid crystal display module, which is capable of being projected onto a screen.

11 Claims, 6 Drawing Sheets

OPTICAL DOCKING STATION

BACKGROUND OF THE INVENTION

The present invention relates to a projector for projecting an image produced by a liquid crystal display.

Portable equipment that must display information to a user, such as laptop computers, have in the past advantageously employed large liquid crystal display (LCD) panels as the primary information display device. Large LCD panels provide significant advantages over other large display devices in terms of volume occupied per unit of display area and in terms of power consumption to operate the display itself. Large LCD panels, however, require illumination and therefore typically require high power consuming cold cathode lamps along with complex light guides to provide reasonably uniform illumination.

It has been suggested that significant power and cost saving can be realized in a next generation laptop computer by replacing the large direct-viewing LCD panel with a virtual image display. Through the use of optical elements, a virtual image display projects a magnified virtual image of a small LCD panel directly into the user's eye. Because of the inherent optical efficiency of a virtual image display of this type, the entire image can be illuminated by a single light emitting diode consuming 5–10 milliwatts of power versus the 1–2 watts of power consumed by conventional large LCD backlighting apparatus. Moreover, because the virtual image display employs relatively easily manufactured small LCD panels, significant cost savings are realizable over the use of the technically challenging large direct-viewing LCD panels. The small size of the virtual image display also allows for a highly portable apparatus. Finally, because a virtual image display can only be seen by a single user, use of a virtual image display also precludes eavesdropping by others when the user is working in a public place, such as on an airplane.

One potentially significant disadvantage, however, is that because the virtual image display can only be seen by one person at a time, a computer or other apparatus equipped with such a display would not be capable of displaying information to two or more persons needing to see the information simultaneously. In such cases, a conventional direct-viewing display would be needed. Moreover, some users may find it uncomfortable to wear or hold the virtual image display in front of the eye. Accordingly, except where the benefits of power savings outweigh the discomfort of holding or wearing a virtual display, visor such a user may prefer a direct-viewing display even for individual use. Although a conventional laptop docking station with a separate cathode ray tube (CRT) display or large panel LCD could be utilized, such an approach would necessarily entail a complete duplicate display device with commensurate added cost.

What is needed is a docking station capable of converting an image produced by a virtual image display into a real image without duplicating the LCD panels, drive electronics and other active components already incorporated into the virtual image display.

SUMMARY OF THE INVENTION

According to the present invention an optical docking station comprises an optical frame and a detachable virtual image display module. The display module comprises a low power light source such as a light emitting diode, one or more beam splitters, polarizers, a liquid crystal display panel and an imaging lens optically coupled to produce an image (as used herein, optically coupled means disposed along an optical path without regard to whether the materials are refractive index matched). When the display module is detached from the optical frame, the light emitting diode provides the primary illumination. A portion of the light from the light emitting diode passes through the beam splitters, as required, to illuminate the liquid crystal display panel, which selectively rotates the polarization axis of the light passing through the individual pixels of the liquid crystal display. The selectively rotated light forms an image as it passes through a polarizer (analyzer). The image thus formed then passes through an imaging lens to form a magnified virtual image of the liquid crystal display panel. When the display module is attached to the projector frame, however, a more powerful light source mounted to the optical frame provides the primary illumination. A portion of the light from the light source passes through an aperture in the display module through the beam splitter to illuminate the liquid crystal display panel. The liquid crystal display panel, illuminated by the more powerful light source, forms an image which passes through the imaging lens to form a real image capable of being projected onto a screen. Depending on the aberration tolerance of the application, a correction lens assembly may be substituted for or interposed between the imaging lens and the screen.

BRIEF DESCRIPTION OF THE DRAWING

The present invention will be better understood from a reading of the following detailed description, taken in conjunction with the accompanying drawing figures in which like references designate like elements and, in which.

DETAILED DESCRIPTION

Figure 1:
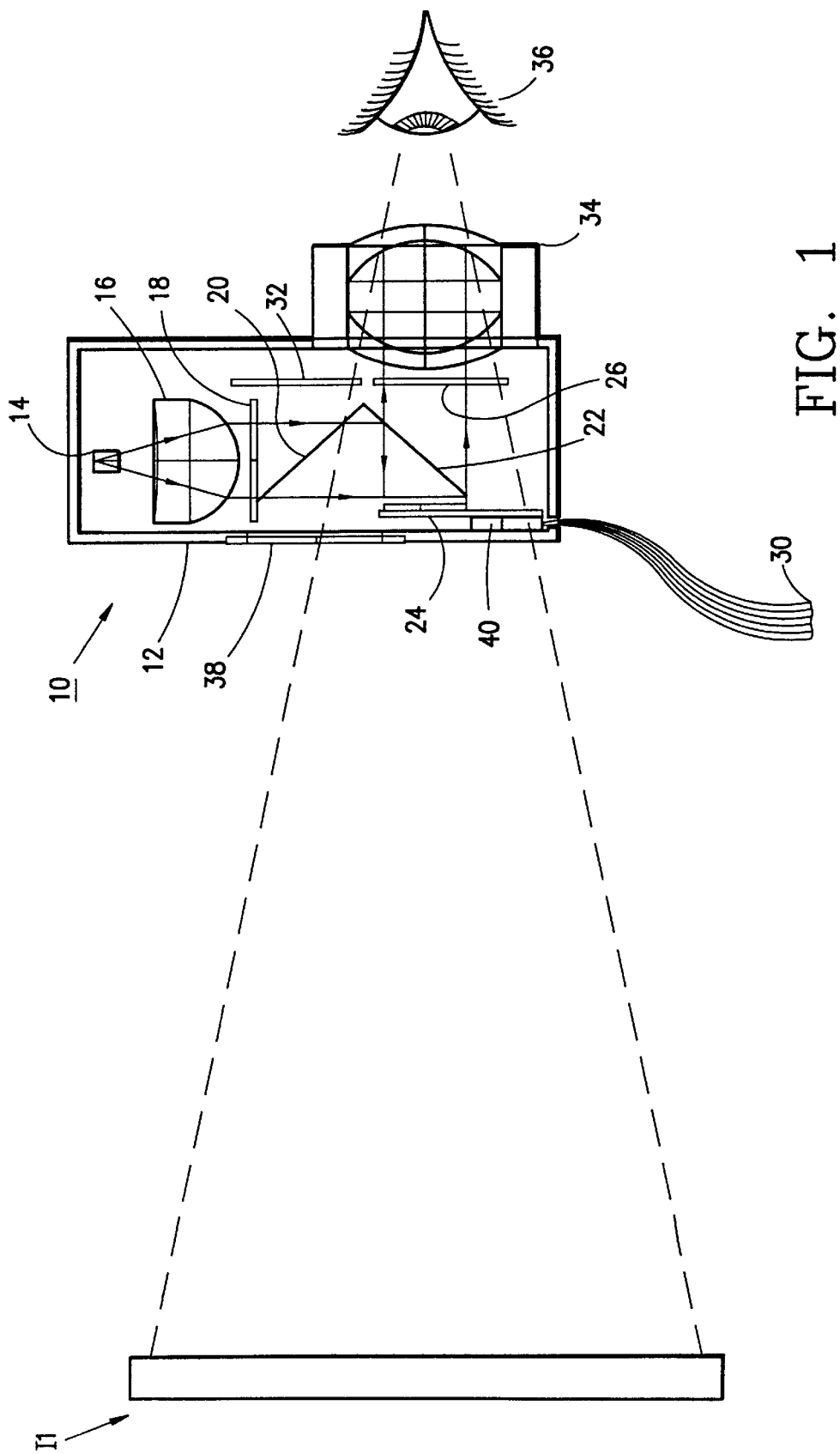
FIG. 1 is a schematic representation of a virtual image display module incorporating features of the present invention.

The drawing figures are intended to illustrate the general manner of construction and are not to scale. In the description and in the claims the terms left, right, front and back and the like are used for descriptive purposes. However, it is understood that the embodiment of the invention described herein is capable of operation in other orientations than is shown and the terms so used are only for the purpose of describing relative positions and are interchangeable under appropriate circumstances.

FIG. 1 schematically depicts a virtual image display module 10 suitable for displaying, for example, visual information from image/information producing portable equipment such as a laptop computer (not shown). In accordance with principles of the present invention, virtual image display module 10 comprises a housing 12 having mounted therein a primary light source comprising a single white light emitting diode (LED) 14, condenser lens 16, first linear polarizer 18, first beam splitter 20, second beam splitter 22, reflective LCD panel 24, and second linear polarizer 26. The display control electronics 40 of module 10 are preferably connected to the image/information producing equipment via umbilical 30 which provides both power and display instructions to the components of the display module. Umbilical 30 preferably comprises a conventional multiple strand ribbon cable.

Light emitted from LED 14 is condensed by condenser lens 16 and polarized by first linear polarizer 18. A portion of the polarized light is reflected by first beam splitter 20 into an absorbing plate 32. Absorbing plate 32 comprises a crossed polarizer, black body, or other means for absorbing the polarized light reflected by first beam splitter 20. The remainder of the polarized light passes through first beam splitter 20 where a portion of the remainder is reflected toward LCD panel 24. LCD panel 24 selectively rotates the polarization axis of the polarized light passing through the individual pixels of panel 24 in conventional fashion and reflects the light back through second beam splitter 22 to create an image as the selectively polarized light passes through second polarizer 26. The image produced by the selectively polarized light passes through imaging lens 34 to form a magnified virtual image "I1" of LCD panel 24, which appears to the user to be located at the nearpoint of the eye (typically about 250–1000 millimeters beyond the actual position of LCD panel 24 relative to the user's eye 36). Module 10 further includes an auxiliary light input port or aperture 38, which comprises a normally closed shutter, iris or similar light excluding means that is selectably openable to admit light from an auxiliary light source as described more fully hereinafter.

Figure 2A:
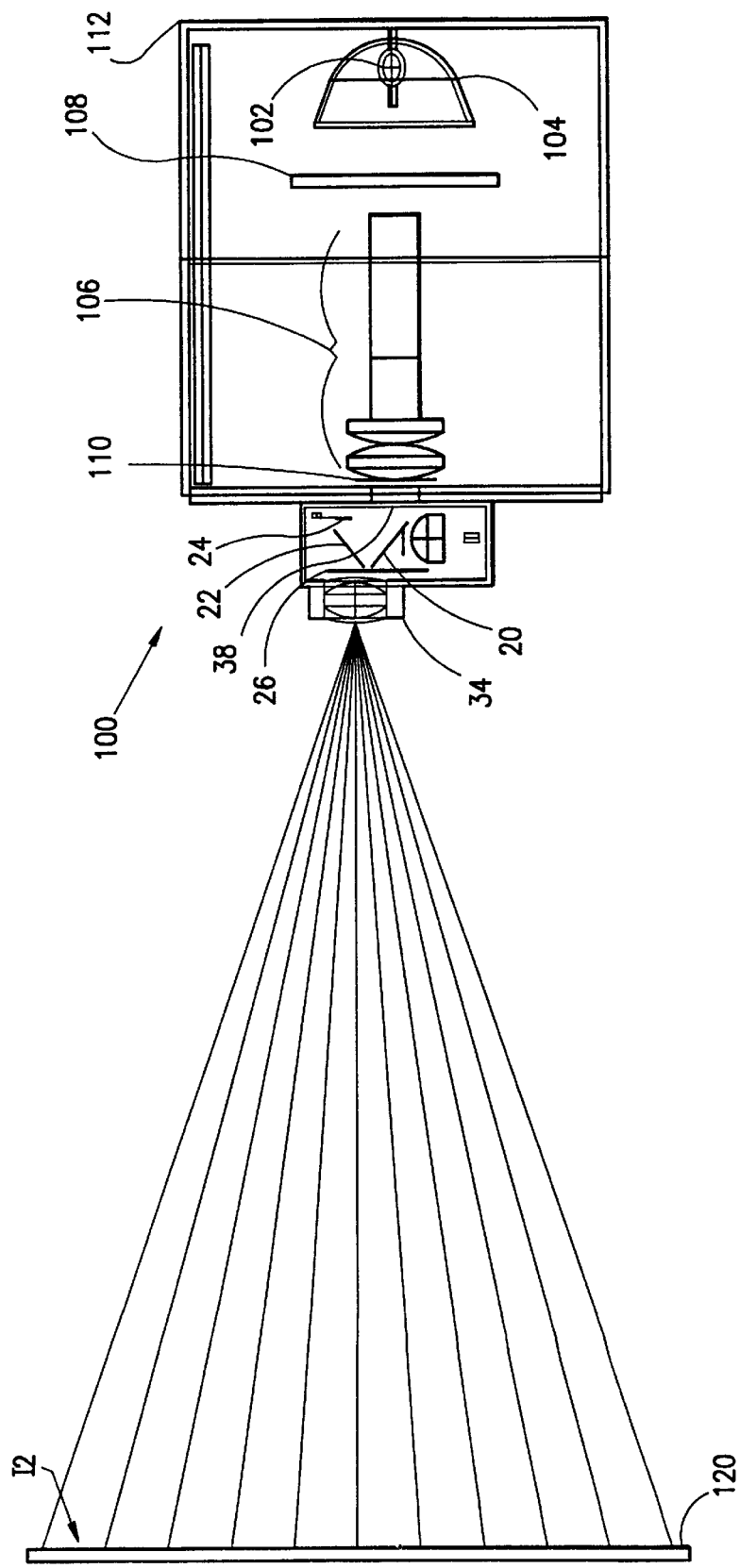
FIG. 2A is a schematic representation of an optical docking station incorporating features of the present invention in which the optical path of the primary and secondary light sources are substantially collinear.

With reference to FIG. 2A, an optical docking station 100 employing features of the present invention comprises a light source 102 a back reflector 104, an integrating lens assembly 106, an infrared/ultraviolet filter 108, and an auxiliary linear polarizer 110 held by an optical frame 112. The light source 102, preferably a metal halide lamp, generates light of an intensity substantially greater than that generated by LED 14. Depending on the needed screen size, light source 102 produces a light output of 300 lumens or more. Light generated by light source 102 is integrated/collimated by integrating lens 106 directly or after reflection from back reflector 104, then linearly polarized by auxiliary linear polarizer 110 to form a substantially homogeneous linearly polarized column of light entering module 10 through auxiliary light input 38. Preferably an infrared/ultraviolet filter 108 is disposed along the optical path to filter out the infrared and ultraviolet radiation which may deteriorate the LCD panel 24 and other sensitive components such the polarizers and any plastic optics. Polarized light entering module 10 through auxiliary light input 38 is transmitted by first beam splitter 20 into absorbing plate 32, where it is absorbed. The remainder of the light exiting auxiliary linear polarizer 110 is reflected by beam splitter 20 toward beam splitter 22, which reflects a portion thereof toward LCD panel 24. LCD panel 24, in turn, selectively rotates the polarization axis of the polarized light passing through the individual pixels of LCD panel 24 in conventional fashion and reflects the light back through second beam splitter 22 to create an image as the selectively polarized light passes through second polarizer 26. The image produced by the selectively polarized light passes through imaging lens 34 to form a magnified real image "I2" of LCD panel 24 projected on a screen 120.

Figure 2B:
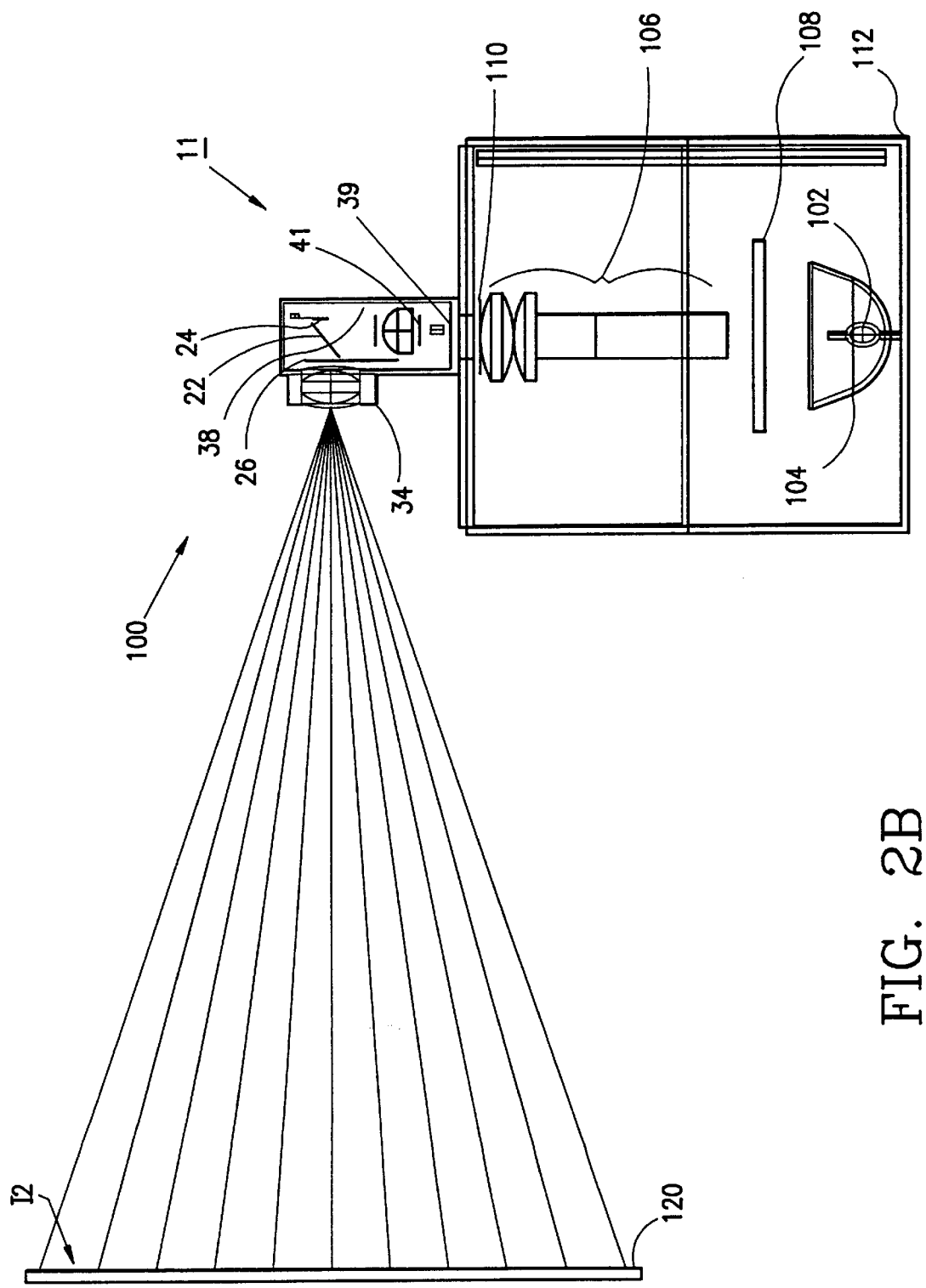
FIG. 2B is a schematic representation of an optical docking station incorporating features of the present invention in which the optical path of the primary and secondary light sources are partially divergent.

As shown in FIG. 2B, an alternative embodiment of module 11 has an auxiliary light input 39 located substantially behind primary LED 14. In the embodiment of FIG. 2B, light entering through auxiliary light input 39 is transmitted through condenser lens 16, first linear polarizer 18 to second beam splitter 22. A portion of light reflected into LCD panel 24 is selectively rotated by LCD panel 24 to form an image as described above. Preferably, a diffuser, such as holographic diffuser 41 is disposed in the optical path to minimize any shading caused by the presence of LED 14.

Figure 3:
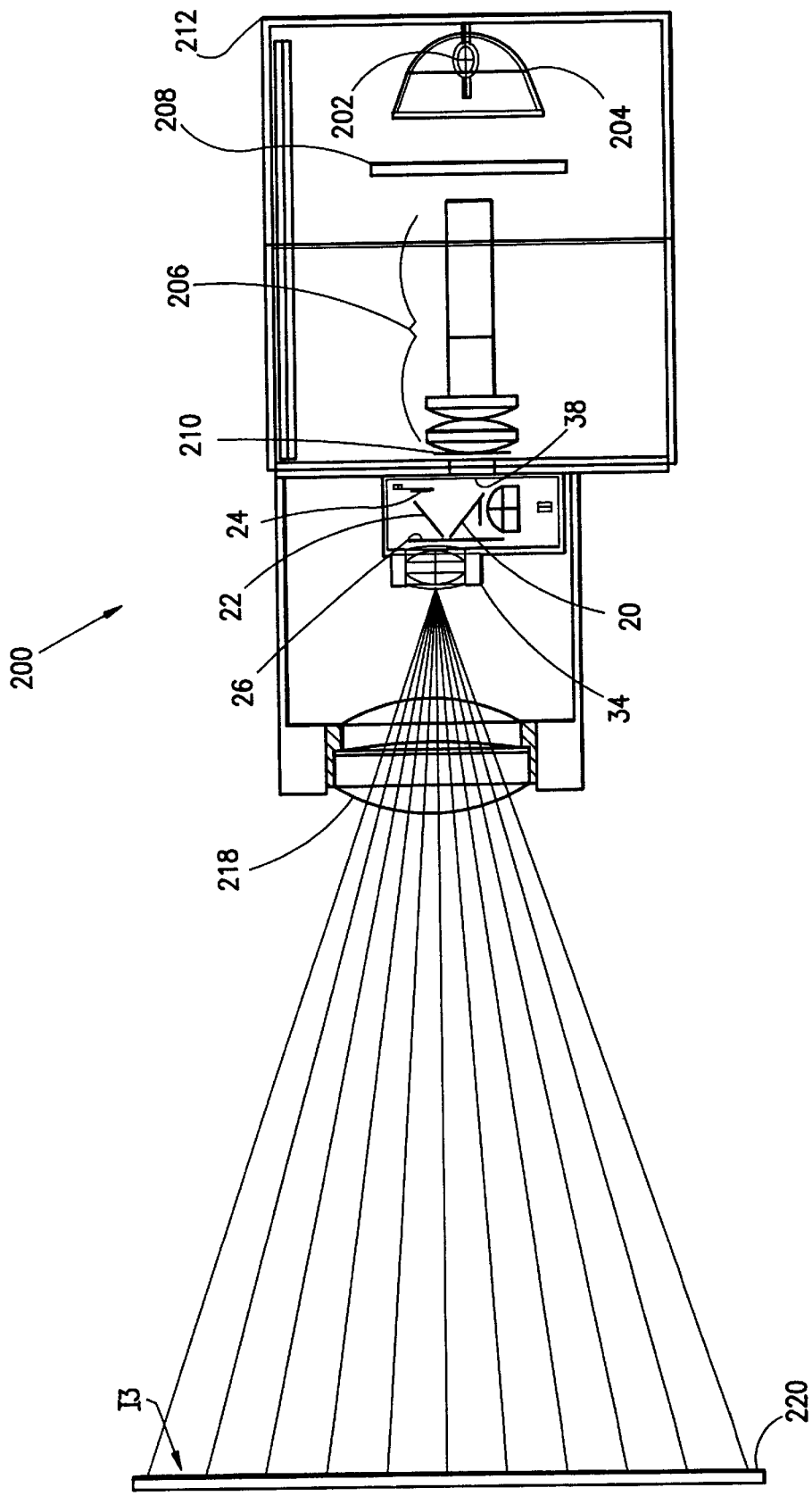
FIG. 3 is a schematic representation of an alternative embodiment of an optical docking station incorporating features of the present invention.

FIG. 3 depicts schematically an alternative embodiment of an optical docking station 200 comprising a light source 202 a back reflector 204, an integrating lens assembly 206, an infrared/ultraviolet filter 208, and an auxiliary linear polarizer 210 held by an optical frame 212. Light generated by light source 202 is integrated/collimated by integrating lens 206 directly and/or after reflection from back reflector 204. Light is then linearly polarized by auxiliary linear polarizer 210 to form a substantially homogeneous linearly polarized column of light entering module 10 through auxiliary light input port 38. Preferably, an infrared/ultraviolet filter 208 is disposed along the optical path to filter out the infrared and ultraviolet radiation. As in the embodiment of FIG. 2, light entering module 10 through auxiliary light input port 38 is polarized by auxiliary polarizer 210. A portion of the light exiting auxiliary polarizer 210 is transmitted by first beam splitter 20 into absorbing plate 32, where it is absorbed. The remainder of the light exiting auxiliary polarizer 40 is reflected by beam splitter 20 toward beam splitter 22, which reflects a portion thereof toward LCD panel 24. LCD panel 24, in turn, selectively rotates the polarization axis of the polarized light passing through the individual pixels of LCD panel 24 in conventional fashion and reflects the light back through second beam splitter 22 to create an image as the selectively polarized light passes through second polarizer 26. The image produced by the selectively polarized light passes through imaging lens 34 and through correction lens 218 to form a magnified real image "I3" of LCD panel 24 projected on a screen 220. Correction lens 218 provides a variable focus distance between imaging lens 34 and screen 220. In the embodiment of FIG. 3, screen 220 may be a front projection or a rear-projection screen depending on whether correction lens 218 also inverts the image.

Figure 4:
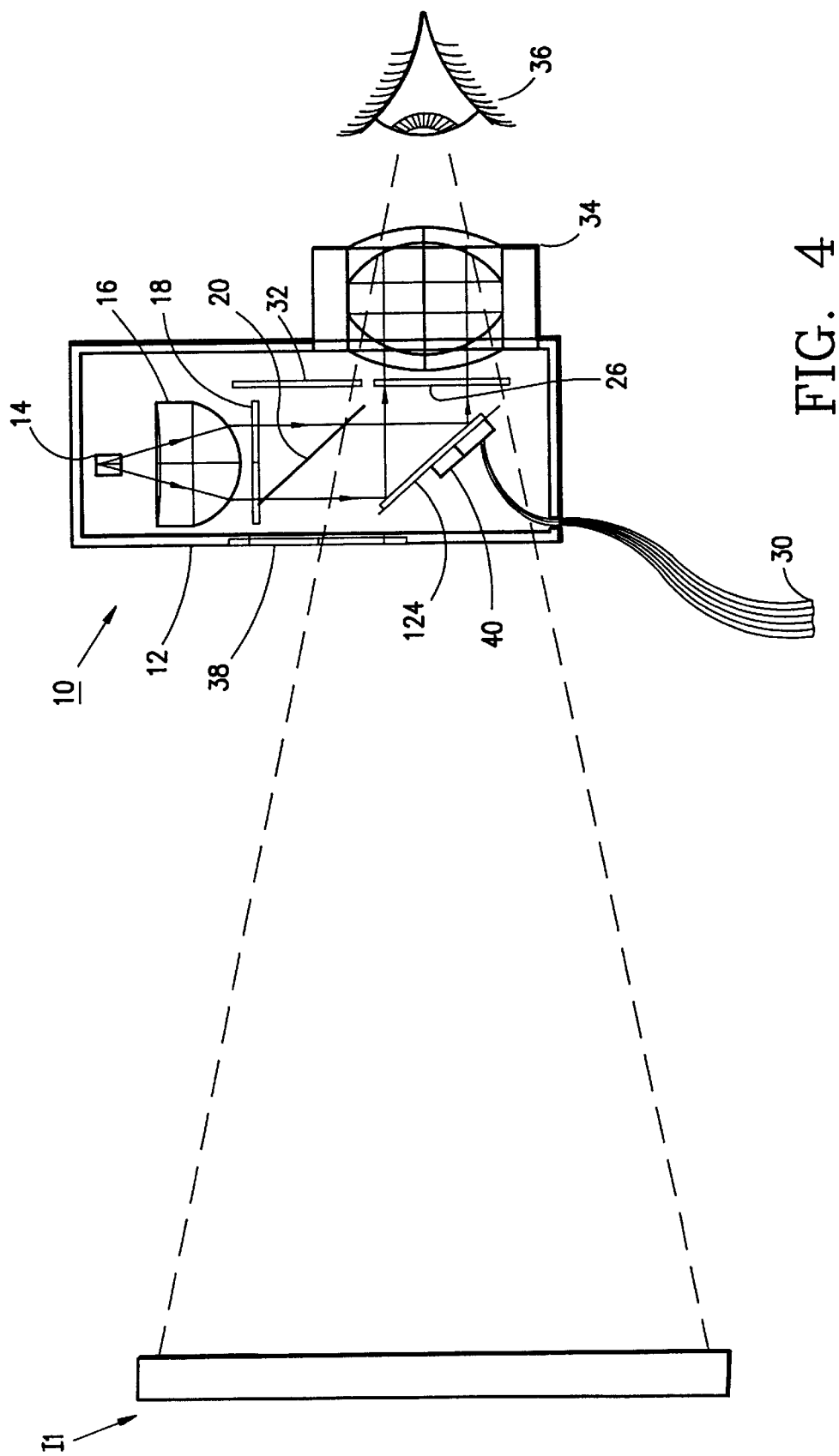
FIG. 4 is a schematic representation of an off-axis illumination embodiment of a virtual image display module for use with an optical docking station incorporating features of the present invention.

As shown in FIG. 4, the principles of the present invention are equally applicable to a virtual image display module utilizing off-axis illumination of the LCD panel. Where off-axis illumination is used, second beam splitter 22 is omitted and LCD panel 124 is mounted at an angle with respect to housing 12 such that the portion of polarized light passing through first beam splitter 20 directly impinges LCD panel 124 and is reflected into imaging lens 134. Imaging lens 134 is adapted to compensate for any keystone distortion or other distortion that may be caused by the angular orientation of LCD panel 124.

Figure 5:
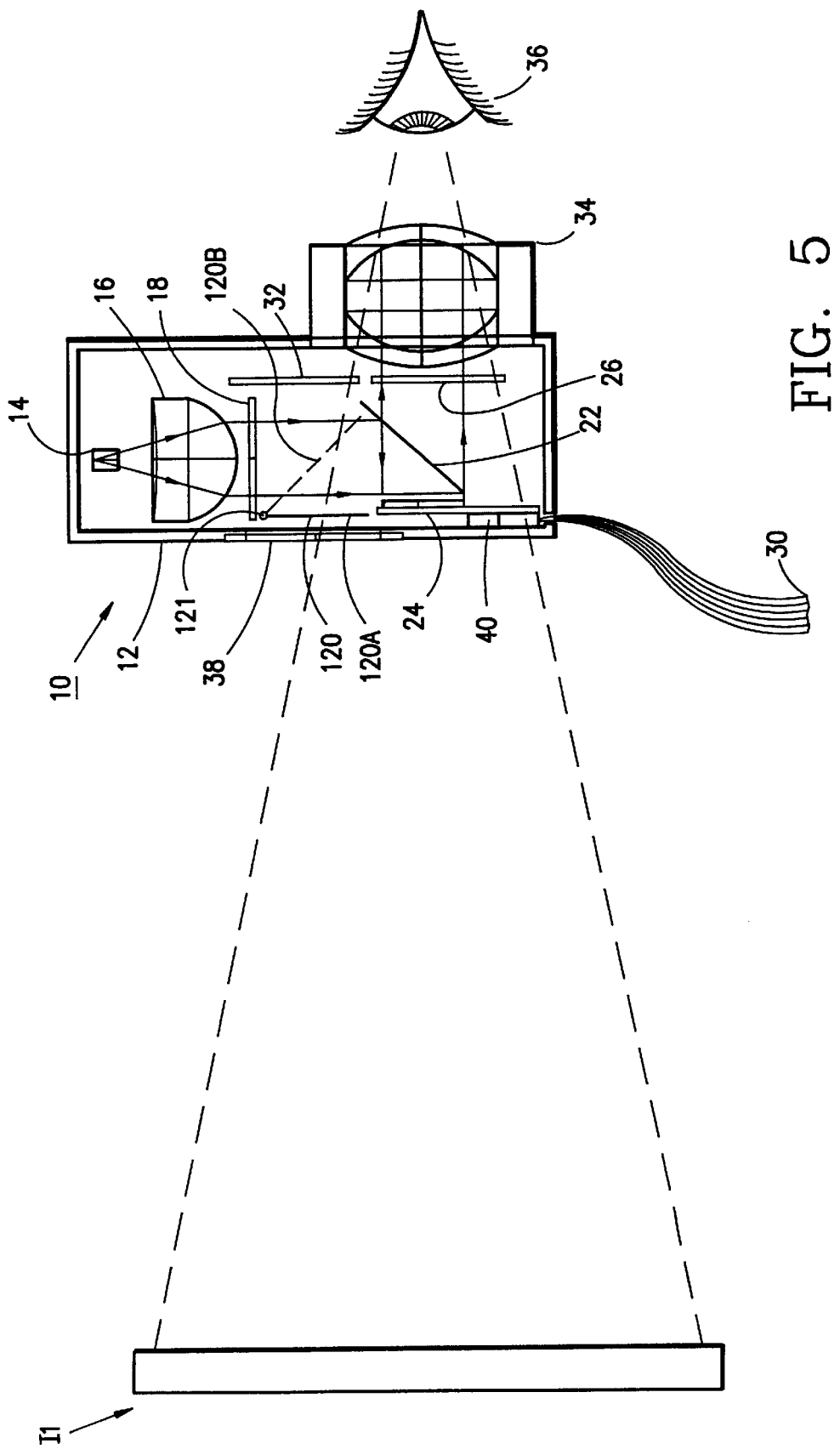
FIG. 5 is a schematic representation of a pivoting mirror embodiment of a virtual image display module for use with an optical docking station incorporating features of the present invention.

FIG. 5 shows an alternative embodiment in which first beam splitter 20 is eliminated in favor of a moveable mirror 120. Moveable mirror 120 is pivotable about an axis 121 between a first position 120A in which mirror 120 is substantially parallel to the line of sight of light emitted from LED 14 toward second beam splitter 22. In first position 120A, moveable mirror 120 is substantially parallel to the line of sight and out of the optical path forming image I1.

Where it is not feasible to move moveable mirror completely out of the optical path, a diffuser (not shown) may be placed in the optical path to minimize any shadowing. Moveable mirror is pivotable about axis 121 from first position 120A to second position 120B. When in position 120B, moveable mirror 120 blocks the optical path from LED 14 and simultaneously provides a reflective surface having substantially greater reflectivity than beam splitter 20 for directing illumination passing through auxiliary light aperture 38. A sensor (not shown) such as a conventional mechanical, electronic, or optical sensor senses whether virtual image display module 10 is positioned in optical docking station 100 and moves moveable mirror 120 accordingly. Use of a moveable mirror in place of first beam splitter 20 provides a more efficient optical path for the high intensity light source in exchange for some added mechanical complexity.

Although certain preferred embodiments and methods have been disclosed herein, it will be apparent from the foregoing disclosure to those skilled in the art that variations and modifications of such embodiments and methods may be made without departing from the spirit and scope of the invention. For example, where a color display is desired, LCD panel 24 may be replaced with a conventional dichroic beam splitter in combination with three complementary LCD panels or a conventional single panel running in sequential color modes. Similarly, where the need for optical efficiency outweighs cost, a polarizing beam splitter can be used in place of the separate polarizers and beam splitters. Accordingly, it is intended that the invention shall be limited only to the extent required by the appended claims and the rules and principles of applicable law.

What is claimed is:

1. A projector comprising:
   a frame;
   a detachable module releasably attached to said frame, said detachable module comprising:
   a primary light source;
   a first beam splitter optically coupled to said primary light source along a first optical path;
   a liquid crystal display optically coupled to said first beam splitter;
   an imaging lens optically coupled to said liquid crystal display, said imaging lens being capable of projecting a virtual image of said liquid crystal display into a viewer's eye when said detachable module is detached from said frame and said liquid crystal display is illuminated by said primary light source; and
   an auxiliary light input port having a normally-closed moveable light excluding member;
   a secondary light source operatively attached to said frame;
   a correction lens operatively attached to said frame, said correction lens being capable of receiving light rays from said imaging lens and projecting a focusable real image of said liquid crystal display onto a screen; and
   means for moving said normally-closed moveable light excluding member from a closed position to an open position in response to said detachable module being mounted to said frame, whereby light from said secondary light source follows a second optical path from said secondary light source, through said auxiliary light input port to said first beam splitter for illuminating said liquid crystal display.

2. The projector of claim 1, wherein:
   said second optical path has a line of sight collinear with said first optical path.

3. The projector of claim 1, wherein:
   said second optical path has a line of sight that is non-collinear with said first optical path.

4. The projector of claim 1, wherein:
   said liquid crystal display is illuminated on-axis by means of a second beam splitter disposed in said first optical path.

5. The projector of claim 1, wherein:
   said liquid crystal display is illuminated off-axis by disposing said liquid crystal display such that a normal to a front surface of said liquid crystal display is at an angle relative to light incident on said liquid crystal display traveling along a line of sight of said first optical path.

6. The projector of claim 1, wherein said moveable light excluding member comprises a shutter.

7. The projector of claim 1, wherein said moveable light excluding member comprises an iris.

8. The projector of claim 1 wherein said detachable module further comprises:
   a second beam splitter disposed along said second optical path between said secondary light source and said first beam splitter and disposed along said first optical path between said primary light source and said first beam splitter, said second beam splitter adapted to direct light rays from said primary light source and said secondary light source to said first beam splitter.

9. The projector of claim 1, wherein:
   said secondary light source has an output of at least 300 lumens.

10. The projector of claim 1, further comprising:
    an integrating lens optically coupled between said secondary light source and said beam splitter.

11. A projector comprising:
    a frame;
    a detachable module releasably attached to said frame, said detachable module comprising:
    a primary light source
    a first beam splitter optically coupled to said primary light source along a first optical path;
    a liquid crystal display optically coupled to said first beam splitter;
    an imaging lens optically coupled to said liquid crystal display, said imaging lens being capable of projecting a virtual image of said liquid crystal display into a viewer's eye when said detachable module is detached from said frame and said liquid crystal display is illuminated by said primary light source;
    an auxiliary light input port; and
    a moveable reflector, said moveable reflector being rotatable about an axis from a first position in which said moveable reflector reflects light entering said auxiliary light input port and directs the light to said first beam splitter and a second position in which said moveable reflector is out of the first optical path from said primary light source to said first beam splitter;
    a secondary light source operatively attached to said frame and capable of directing a source of light into said auxiliary light input port when said detachable module is attached to said frame;
    a correction lens operatively attached to said frame, said correction lens being capable of receiving light rays from said imaging lens and projecting a focusable real image of said liquid crystal display onto a screen; and means for moving said moveable reflector from said second position to said first position in response to said detachable module being mounted to said frame, whereby light from said secondary light source follows a second optical path from said secondary light source, through said auxiliary light input port, off said moveable reflector to said first beam splitter for illuminating said liquid crystal display.

* * * * *